A. M. BARNES.
SEARCHLIGHT AND OTHER MIRROR.
APPLICATION FILED OCT. 14, 1918.
1,304,844.
Patented May 27, 1919.
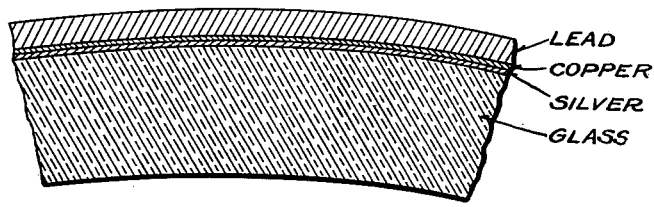
Inventor
Albert Moore Barnes
By Foster, Freeman, Watson & Coit
Attorneys

UNITED STATES PATENT OFFICE.

ALBERT MOORE BARNES, OF BRIGHTON, ENGLAND.

SEARCHLIGHT AND OTHER MIRROR.

1,304,844.	Specification of Letters Patent.	Patented May 27, 1919.

Application filed October 14, 1918. Serial No. 258,113.

*To all whom it may concern:*

Be it known that I, ALBERT MOORE BARNES a subject of the King of England, and residing at Brighton, in the county of Sussex, England, have invented certain new and useful Improvements in Searchlight and other Mirrors, of which the following is a specification.

This invention relates to protective backings for mirrors and particularly to mirrors forming the reflecting surfaces of military and naval searchlights which are subjected to the action of injurious gases, moisture, and considerable rough handling, and in which the backing must be such that the great heat from the source of light in front of the mirror must be conducted away quickly without permanent injury to the mirror or its backing.

The objects of the invention are to provide a backing for mirrors of this class which is easy to apply, is inexpensive and light in weight, and which will not become disarranged in use. Additional important objects of the invention are to provide such a backing which resists the action of injurious gases tending to destroy the same, which is adapted to conduct the intense heat of the arc or other source of light in front of the mirror rapidly away, which resists the injurious action of moisture, and which renders unnecessary the use of means and devices for attaching, mechanically, a protecting body or shell to the back of the mirror. A further object is to provide a metallic backing having the above advantages and yet at the same time giving the mirror substantial protection against mechanical shock from the back, protecting not only the glass, but the silvered surface.

The invention will be fully disclosed in the following description when taken in connection with the accompanying drawing in which the single figure represents an enlarged cross section of a portion of a concave mirror having my improved backing.

The mirror illustrated and hereinafter claimed comprises the usual glass portion which is polished on both sides and which may be plain, convex, or concave, and a backing of three layers of metal, the first layer of which comprises the reflecting surface deposited directly upon the glass, and the other two layers comprising protective coverings for the silver layer. The dense and impervious silver coating is in absolute contact with the glass surface on which it is deposited. The second layer is a tough and impervious copper coating in perfect metallic contact with the silver coating, and the third layer is a ductile and soft coating of lead also in actual metallic contact with the copper.

The entire surface exposed to the atmosphere and subjected to handling consists of pure lead which possesses in the highest degree the essential properties necessary to afford the greatest protection against the action of sea air, moisture, injurious gases, etc., to the action of which the mirrors, particularly of the military and naval type, are exposed in use under service conditions. From the calculated arrangement of the various metals employed and which constitute the reflector and protective backing in the order given, viz., silver, copper, lead, their relative thicknesses and their metallic adhesion each to each and laminated structure, they afford heat conducting and radiating qualities of the highest order and are entirely unaffected by temperatures approaching closely the melting point of lead, which is much in excess of any temperature to which the mirror so treated can be exposed in use in projectors of the character described.

The silvering of the mirror is performed by a spraying device whereby a silver solution and a reducing solution are caused to mingle together as they are directed on to the back of the mirror by the operator and from which they flow in a thin and continuous film of actively silver depositing liquid. In this manner the film of pure silver is gradually built up on the glass surface of the mirror to which it adheres as an even deposit and on which it forms a sufficiently dense and homogeneous coating which is opaque to the strongest light source. The copper coating is deposited by any well known electrolytic means and the lead coating is deposited in a similar manner to the copper coating. In practice the copper coating is generally between 1/30 and 1/50 of a millimeter in thickness, while the lead coating is generally of a thickness of about 0.15 millimeter, but this can be increased or decreased as desired.

I am aware that hitherto searchlight mirrors have been silvered, have had the silver film coated with varnish or paint, and on the back of the varnished silver a sheet of lead or copper previously pressed to shape has been laid, the sheet being beaded over at the periphery and clamped to the rim by a metal ring adapted to be contracted after being placed in position. I am also aware that silvered mirrors have been provided with a coating of copper applied by an electrodeposition and also that where the reflecting surface of the mirror is coated with gold that a silvered coating has been applied to the gold and a coating of copper to the silver. It has been found, however, that with the mirrors manufactured by these processes, the considerable variations in temperature and atmospheric conditions to which they are subject under actual working conditions, causes deterioration and loss of efficiency to proceed at a fairly rapid rate.

As I have previously pointed out, however, the combination with a silvered mirror of a copper coating and the lead coating deposited in the order and in the manner described provides a superior article, the copper (or other suitable similar metal) providing a non-porous and homogeneous covering of good thermal conductivity and the coating of lead or like malleable ductile metal forming a final and complete protection because of its peculiar properties against the action of gases, moisture, etc.

Having thus described my invention what I claim and desire to secure by Letters Patent is:—

1. A searchlight or other mirror having a reflecting and protective backing comprising a homogeneous and nonporous reflecting metal film deposited by intermingling suitable chemical solutions and directing them on to the glass or like surface, a thin film of a metal of good thermal conductivity deposited electrolytically on the reflecting film so as to be metallically incorporated therewith and an outer coating of malleable and ductile metal deposited upon the film of metal of good thermal conductivity and metallically incorporated therewith such outer coating being resistant to air, injurious gases, moisture and heat, the films and outer coating forming a compound metallic coating in metallically adherent laminations adherent to the glass through the agency of the reflecting film substantially as set forth.

2. A searchlight or other mirror having a reflecting and protective backing comprising a homogeneous and nonporous reflecting film of silver deposited by intermingling suitable chemical solutions and directing them on to the glass or like surface, a thin film of copper deposited electrolytically on the silver film so as to be metallically incorporated therewith and an outer coating of lead deposited upon the film of copper and metallically incorporated therewith the films of silver and copper and the outer coating of lead forming a compound metallic coating in metallically adherent laminations adherent to the glass through the agency of the silver film substantially as set forth.

In testimony whereof I have signed my name to this specification.

ALBERT MOORE BARNES.